United States Patent
Kakde et al.

(10) Patent No.: US 11,317,156 B2
(45) Date of Patent: Apr. 26, 2022

(54) VIDEO ANALYTICS FOR MODIFYING TRAINING VIDEOS FOR USE WITH HEAD-MOUNTED DISPLAYS

(71) Applicant: Honeywell International Inc., Morris Plains, NJ (US)

(72) Inventors: Ashwath Kakde, Bangalore (IN); Venkata Talamanchi, Bangalore (IN); Prasad Kamath, Bangalore (IN); Ramesh Babu Koniki, Bangalore (IN); Ramesh Naga, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 41 days.

(21) Appl. No.: 16/585,961

(22) Filed: Sep. 27, 2019

(65) Prior Publication Data
US 2021/0099763 A1   Apr. 1, 2021

(51) Int. Cl.
*H04N 21/472* (2011.01)
*G11B 27/031* (2006.01)
*H04N 5/232* (2006.01)
*H04N 21/235* (2011.01)

(52) U.S. Cl.
CPC ..... *H04N 21/47205* (2013.01); *G11B 27/031* (2013.01); *H04N 5/23264* (2013.01); *H04N 21/2353* (2013.01); *G06K 2209/27* (2013.01)

(58) Field of Classification Search
CPC .... G11B 27/02–06; G11B 27/031–038; G06K 9/00624–00845; H04N 21/2353; H04N 21/47205; H04N 5/23264–23287; H04N 5/23222; G06T 7/73; G06F 3/048; G06Q 10/10
See application file for complete search history.

(56) References Cited

U.S. PATENT DOCUMENTS

2006/0251382 A1* 11/2006 Vronay ............... H04N 7/15
                                                             386/242
2012/0114310 A1   5/2012 Hymel et al.
(Continued)

FOREIGN PATENT DOCUMENTS

EP         2450898 A1    9/2012

OTHER PUBLICATIONS

Diemert, Benjamin, et al. "Mapping semantic script with image processing algorithms to leverage amateur video material in professional production." Multimedia tools and applications 62.2 (2013): 333-358. (Year: 2013).*

(Continued)

*Primary Examiner* — Liang Y Li
(74) *Attorney, Agent, or Firm* — Seager, Tufte & Wickhem, LLP (57) ABSTRACT

A method of creating and/or modifying a video for use in a head-mounted display while a user of the head-mounted display is carrying out a task that is illustrated by the video. The method may include processing an initial video to automatically determine when the initial video does not cover key aspects of the task and thus when video mashing is desired. When video mashing is desired, a supporting video is obtained to cover the missing key aspects, and the initial video and the supporting video are automatically mashed, result in a composite video for subsequent display on the head-mounted display.

15 Claims, 7 Drawing Sheets

(56) References Cited

U.S. PATENT DOCUMENTS

| | | | | |
|---|---|---|---|---|
| 2013/0227415 A1* | 8/2013 | Gregg | ................. | G11B 27/031 |
| | | | | 715/723 |
| 2017/0085786 A1* | 3/2017 | Ishida | ................ | H04N 5/23222 |
| 2018/0131907 A1* | 5/2018 | Schmirler | .......... | G05B 23/0216 |
| 2018/0173938 A1* | 6/2018 | Yang | ................. | G06K 9/00281 |
| 2018/0173959 A1* | 6/2018 | Shah | ................. | G06K 9/00744 |
| 2018/0181370 A1 | 6/2018 | Parkinson | | |
| 2018/0181810 A1 | 6/2018 | Jhawar et al. | | |
| 2019/0087870 A1* | 3/2019 | Gardyne | ............ | G06Q 30/0276 |
| 2020/0162641 A1* | 5/2020 | Thota | .................. | G06F 3/04847 |
| 2020/0185006 A1* | 6/2020 | Tene | ................... | G11B 27/102 |

OTHER PUBLICATIONS

Pavel, Amy, et al. "VidCrit: video-based asynchronous video review." Proceedings of the 29th annual symposium on user interface software and technology. 2016. (Year: 2016).*
European Search Report, EP Application No. 20197314.6, dated Feb. 25, 2021 (8 pages).

* cited by examiner

VIDEO ANALYTICS FOR MODIFYING TRAINING VIDEOS FOR USE WITH HEAD-MOUNTED DISPLAYS

TECHNICAL FIELD

The present disclosure relates generally to training videos and more particularly to using video analytics to create and/or modify training videos, especially for use with head-mounted displays.

BACKGROUND

Training videos may be produced that demonstrate a variety of different tasks. Some training videos may be created in order to aid a field worker in performing an operational or maintenance task in an industrial facility. In some instances, creation and modification of these training videos may be useful in improving the training videos. For example, a particular training video may be filmed at a particular angle of capture, or at a particular focal length. Depending on how the training video is to be viewed, there may be a need to change and/or supplement how the video is captured. For example, there may be a need to provide a close-up view of a piece of equipment, in addition to an expanded view. What would be desirable is an improved way of creating and/or modifying training videos, particularly an automatic way of determining which training videos should be modified and/or supplemented, and how they should be modified and/or supplemented.

SUMMARY

The present disclosure relates generally to methods of producing technical guidance videos. A particular example of the disclosure includes a method of producing a technical guidance video to aid a field worker in performing one or more operational and/or maintenance tasks of a predefined operational and/or maintenance procedure in an industrial facility. The illustrative method includes storing metadata in a memory, wherein the metadata identifies one or more key aspects of each of the one or more operational and/or maintenance tasks of the predefined operational and/or maintenance procedure. A first video is captured of one or more of the operational and/or maintenance tasks of the predefined operational and/or maintenance procedure while being performed. The first video is processed along with the metadata to automatically determine whether the one or more key aspects identified in the metadata for the one or more of the operational and/or maintenance tasks captured in the first video are not captured with at least a threshold readability in the first video. When the one or more key aspects identified in the metadata for the one or more of the operational and/or maintenance tasks captured in the first video is not captured with at least the threshold readability in the first video, a notification is provided that a second video should be captured. In response to the notification, a second video is captured of one or more of the key aspects identified in the metadata for the one or more of the operational and/or maintenance tasks that were not captured with at least the threshold readability in the first video. The second video and the first video may be mashed, thereby resulting in the technical guidance video. The technical guidance video may be subsequently displayed on a head-mounted display of a field worker to aid the field worker in performing the one or more of the operational and/or maintenance tasks of the predefined operational and/or maintenance procedure.

Another example of the disclosure includes a method of modifying a video for use in a head-mounted display, wherein the video is intended to be displayed while a user of the head-mounted display is carrying out a task that is illustrated by the video. The illustrative method includes analyzing one or more frames of the video to identify objects shown in the video and then performing image comparison between the identified objects and a template in order to identify objects that are critical to a procedure. The one or more frames are analyzed to ascertain whether the objects that are critical to a procedure meet a predetermined readability threshold.

When the objects that are critical to a procedure are determined not to meet the predetermined readability threshold, a secondary video is obtained that shows the objects that are critical to the procedure. One or more frames from the secondary video showing the objects that are critical to the procedure are incorporated in the video before providing the video for subsequent retrieval by the head-mounted display.

Another example of the disclosure includes a method of modifying a video for use in a head-mounted display while a user of the head-mounted display is carrying out a task that is illustrated by the video. The illustrative method includes processing the video to automatically determine when video mashing is desired. When video mashing is desired, a supporting video is captured and the video and the supporting video are processed to automatically mash the supporting video and the video, result in a composite video for subsequent display on the head-mounted display.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

Figure 1:
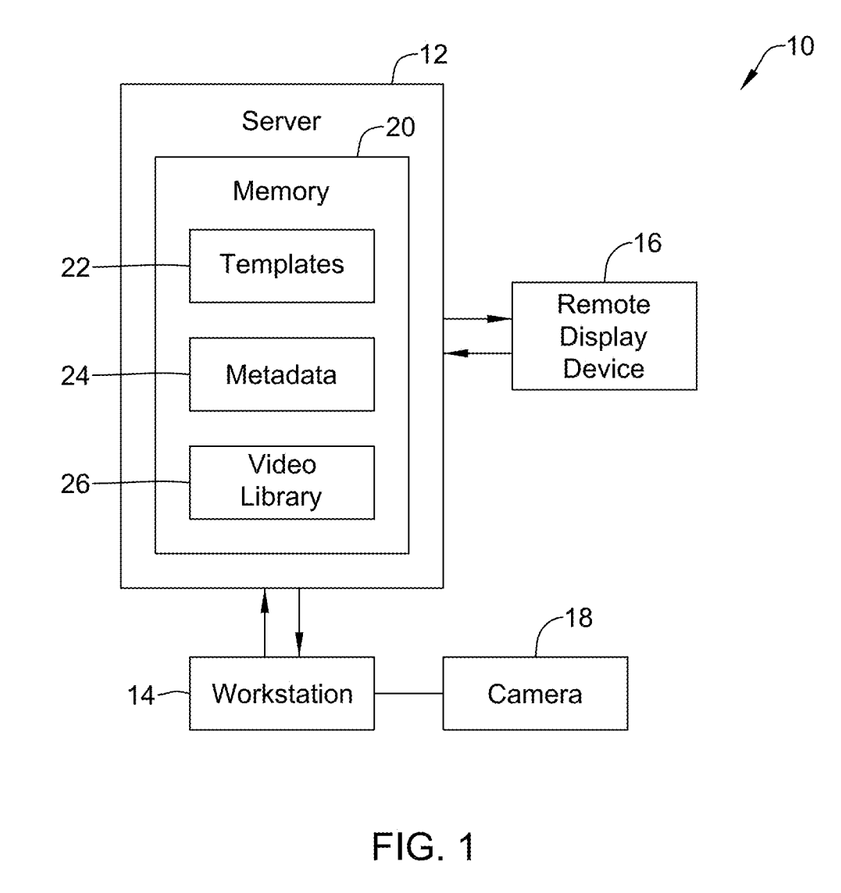
FIG. 1 is a schematic block diagram of an illustrative video production system.

FIG. 1 is a schematic block diagram of an illustrative video production system 10. The illustrative video production system 10 may be configured to analyze a video such as a technical guidance video and automatically determine whether the technical guidance video properly shows what the video needs to show, or if additions or other edits to the video are appropriate. It will be appreciated that in some cases, the technical guidance videos may be created by Industrial Field Experts for use by Industrial Field Workers. The Industrial Field Experts are individuals who have the experience and technical expertise to be able to show others how to perform various operational and/or maintenance procedures on a variety of equipment, while Industrial Field Workers are individuals that are tasked with performing these various operational and/or maintenance procedures.

In some cases, the Industrial Field Workers may be relatively less experienced, and thus technical guidance videos may be useful. It will be appreciated that various industries may have a vast number of different pieces of equipment that need to be adjusted or maintained, and it can be difficult for a particular Industrial Field Worker to remember all of the necessary details for adjusting and/or maintaining hundreds or even thousands of different pieces of equipment such as gauges, meters, valves, control modules, tools and safety equipment. Moreover, it may be difficult or even dangerous for an Industrial Field Worker to carry and access volumes of printed manuals, for example.

The illustrative video production system 10 may be considered as including a server 12 that is configured to communicate with a workstation 14 as well as a remote display device 16. The workstation 14 may be considered as being configured to communicate with a camera 18. The server 12, which may be a cloud-based server or a physical server, includes a memory 20 that stores information for use by the server 12. The memory 20 may include templates 22, metadata 24 and a video library 26. As will be discussed in greater detail, the templates 22 may provide information as to what particular objects need to be visible in a particular technical guidance video. For example, if a particular technical guidance video is directed to instructing someone how to perform a specific task on a specific piece of equipment, the template 22 that corresponds to that particular technical guidance video may include an image or other information identifying that particular piece of equipment. Information within a particular template 22 may be used by the server 12 to confirm that the particular technical guidance video shows the correct equipment, for example.

The metadata 24 that is stored within the memory 20 may also be used in identifying equipment and/or other features within a particular technical guidance video. In some cases, the metadata 24 may also be used to help identify a particular technical guidance feature as requested by the remote display device 16, as will be discussed in greater detail. Illustrative but non-limiting examples of metadata 24 include but are not limited to a procedure category, keywords related to the equipment such as vendor or manufacturer name, make, model, serial number and the like, keywords connecting the equipment to a control system or algorithm, keywords related to equipment type such as but not limited to pump, valve, furnace, compressor, heat exchanger and the like, the physical location of the equipment, a time that a particular video was captured, and perhaps user attributes such as name, phone number, email address and the like. The metadata 24 may also identify one or more key aspects of each of the one or more operational and/or maintenance tasks of the predefined operational and/or maintenance procedure. For example, a key aspect of a particular operational and/or maintenance task may be a reading of a particular gauge of a particular piece of equipment. In another example, a key aspect of a particular operational and/or maintenance task may be a particular position of a valve and/or a particular setting of a controller. In some cases, the key aspects may include identifying "critical to procedure" objects, which are considered critical to show in the video of the task with adequate readability. The key aspects may be identified and stored in the metadata, and the server may compare captured video to help ensure that the key aspects identified in the metadata are indeed captured in the video, with adequate readability. If not, one or more supplemental video(s) may need to be captured for those missing key aspects.

The video library 26 may be considered as storing a plurality of technical guidance videos that are each intended to help a field worker with performing a predefined operational and/or maintenance procedure in an industrial facility such as a manufacturing facility, a chemical processing facility, an oil refining facility, and others. The video library 26 may include both technical guidance videos that have been supplemented by the video production system 10 as well as videos that have not yet been supplemented by the video production system 10. The video library 26 may, for example, also store supplemental video clips that may be used by the video production system 10 in supplementing videos to create technical guidance videos.

The workstation 14 may be a desktop computer or a laptop computer. The workstation 14 may be a tablet, a mobile phone, a head mounted display device and/or any other suitable device. A user such as an Industrial Field Expert may utilize the workstation 14 to access the server 12 for viewing and supplementing videos in order to create technical guidance videos, or to view technical guidance videos that are stored on the server 12 within the video library 26. The Industrial Field Expert may use the workstation 14 to receive recommendations from the server 12 pertaining to additional video clips needed, for example. The Industrial Field Expert may also use the workstation 14 to view videos and to control the camera 18, which may be used by the Industrial Field Expert to capture video clips for use by the video production system 10 in creating and/or supplementing a particular technical guidance video. The camera 18 may be a video camera. In some cases, the camera 18 may be a still camera. It is contemplated that the camera 18 may be incorporated into the workstation 14, or may be a separate device.

In some cases, the camera 18 may be used, such as under the control of the workstation 14, or under direct control of the Industrial Field Expert, to capture Procedure Inserts. A Procedure Insert is a shot of part of a scene as captured from a different angle and/or focal length, relative to that of the main video. In some cases, Procedure Inserts may be considered as covering action that is already covered in the main video but emphasize a different aspect of that action or provide improved readability, due to the differences in framing. The camera 18 may be used to create a Procedure Cutaway. A Procedure Cutaway covers action that is not covered and/or outside the field of view of the main video. The camera 18 may be used to create a Procedure Sneak. A Procedure Sneak provides a quick before and/or after state of a particular piece of equipment. These are just examples.

The remote display device 16 may be any display device that a user such as an Industrial Field Worker may use to view one or more technical guidance videos. The remote display device 16 may be configured to be in communication with the server 12. As a result, the Industrial Field Worker may request a particular technical guidance video from the server 12, either by using voice-activated commands, gestures, and/or perhaps using a keyboard or other data entry device forming a portion of the remote display device 16. The remote display device 16 may be considered as including a computer. In some cases, the remote display device 16 may include a head-mounted display that the Industrial Field Worker can view hands-free. In some instances, this allows the Industrial Field Worker to view both the actual piece of equipment and the appropriate technical guidance video while the Industrial Field Worker is physically looking at the actual piece of equipment. The remote display device 16 may include both a computer and a display in a device that the Industrial Field Worker can wear on their head, thereby permitting both of their hands to be free to carry out whatever task is before them. As an example, the remote display device 16 may be an Intelligent Wearable such as the RealWear HMT-1 and the RealWear HMT-1Z1 commercially available from Honeywell International Inc.

The server 12 may store and/or operate one or more software algorithms that may be used by the server 12 (or optionally by the workstation 14, if desired) to supplement videos in order to create technical guidance videos for use by the Industrial Field Workers. The software algorithms may include an algorithm that may be run by the server 12 (or by the workstation 14) to review a particular technical guidance video to ensure that the video is captured at an appropriate angle of capture and/or an appropriate focal length. These values may change, for example, depending on how the field worker will ultimately view the particular technical guidance video using the remote display device 16. If a particular video step requires a different angle of capture, a different focal length and/or a different field of view, the server 12 (or the workstation 14) may inform an industrial field expert to capture a supporting video with the appropriate angle of capture, appropriate focal length and/or appropriate field of view, for example.

Figure 2:
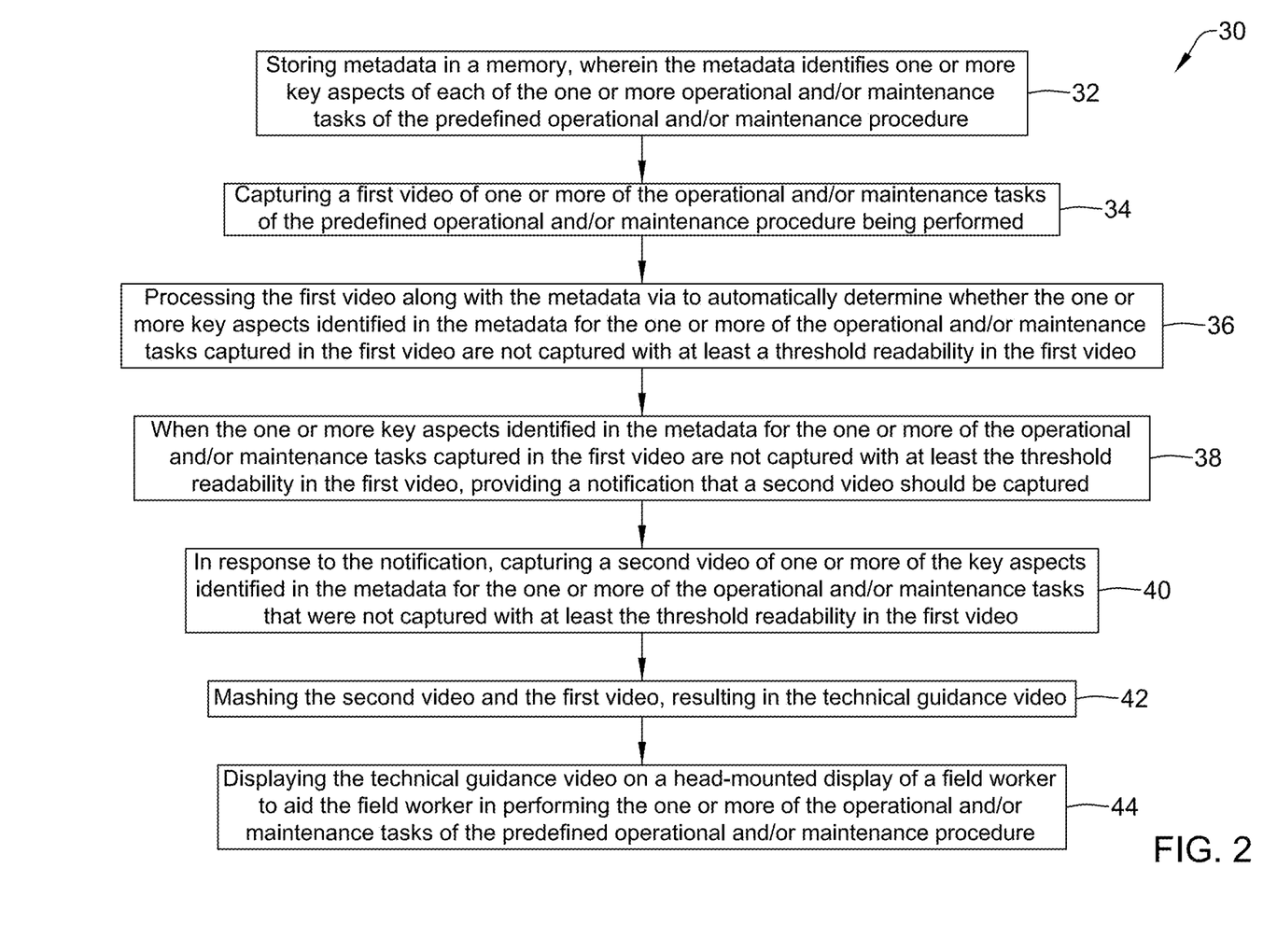
FIG. 2 is a flow diagram showing an illustrative method that may be carried out using the illustrative video production system of FIG. 1.

FIG. 2 is a flow diagram showing an illustrative method 30 of producing a technical guidance video to aid an industrial field worker in performing one or more operational and/or maintenance tasks of a predefined operational and/or maintenance procedure in an industrial facility. The illustrative method 30 includes storing metadata in a memory, wherein the metadata identifies one or more key aspects of each of the one or more operational and/or maintenance tasks of the predefined operational and/or maintenance procedure, as indicated at block 32. A first video is captured of one or more of the operational and/or maintenance tasks of the predefined operational and/or maintenance procedure being performed, as indicated at block 34. As seen at block 36, the first video is processed along with the metadata to automatically determine whether the one or more key aspects identified in the metadata for the one or more of the operational and/or maintenance tasks captured in the first video are not captured with at least a threshold readability in the first video.

When the one or more key aspects identified in the metadata for the one or more of the operational and/or maintenance tasks captured in the first video are not captured with at least the threshold readability in the first video, a notification is provided that a second video should be captured, as indicated at block 38. In response to the notification, and as indicated at block 40, a second video is captured of one or more of the key aspects identified in the metadata for the one or more of the operational and/or maintenance tasks that were not captured with at least the threshold readability in the first video. As indicated at block 42, the second video and the first video are mashed, resulting in the technical guidance video. Mashing the second video and the first video may include inserting selected video frames from the second video into the first video. In some cases, inserting the selected video frames from the second video into the first video includes overlaying the selected video frames over part of one or more frames of the first video. In some instances, inserting the selected video frames from the second video into the first video includes splicing in the selected video frames between two frames of the first video. Mashing the second video and the first video may, for example, include inserting selected video frames from the first video into the second video. As indicated at block 44, the technical guidance video is displayed on a head-mounted display of a field worker to aid the field worker in performing the one or more of the operational and/or maintenance tasks of the predefined operational and/or maintenance procedure. In some cases, displaying the technical guidance video on the head-mounted display of the Industrial Field Worker may occur in response to the Industrial Field Worker requesting display of the technical guidance video on the head-mounted display, for example.

A selected one of the key aspects identified in the metadata for one or more of the operational and/or maintenance tasks captured in the first video may be considered as not being captured with at least the threshold readability when the first video is captured from a camera angle that is too oblique (e.g. >30, 45, 60, 80 or any other number of degrees off from the head on view) relative to the selected one of the key aspect. In some cases, a selected one of the key aspects identified in the metadata for one or more of the operational and/or maintenance tasks captured in the first video may be considered as not being captured with at least the threshold readability when the first video is captured such that the selected one of the key aspect is not in focus (e.g. greater than a Just Noticeable Difference (JND)). As another example, a selected one of the key aspects identified in the metadata for one or more of the operational and/or maintenance tasks captured in the first video may be considered as not being captured with at least the threshold readability when the selected one of the key aspects identifies interaction between a first object and a second object, and the first video does not capture both the first object and the second object. As yet another example, a selected one of the key aspects identified in the metadata for one or more of the operational and/or maintenance tasks captured in the first video may be considered as not being captured with at least the threshold readability when the first video is captured such that the selected one of the key aspect is too small (e.g. a key gauge is captured in less than 100, 200, 400, 1000 or any number of pixels). These are just examples.

In some cases, for example, processing the first video along with the metadata may include identifying "critical to procedure" objects, which include the first object and the second object, and determining whether all "critical to procedure" objects are captured in the first video, and if not determining that the one or more key aspects identified in the metadata for the one or more of the operational and/or maintenance tasks captured in the first video are not captured with at least the threshold readability in the first video. In some cases, determining whether all "critical to procedure" objects are captured in the first video may include comparing objects in the first video to template images of the identified "critical to procedure" objects. As another example, the one or more key aspects may include visibility of a piece of equipment. As another example, the one or more key aspects may include visibility of a predetermined part of a piece of equipment and/or a predetermined threshold magnification of the predetermined part of the piece of equipment.

Figure 3:
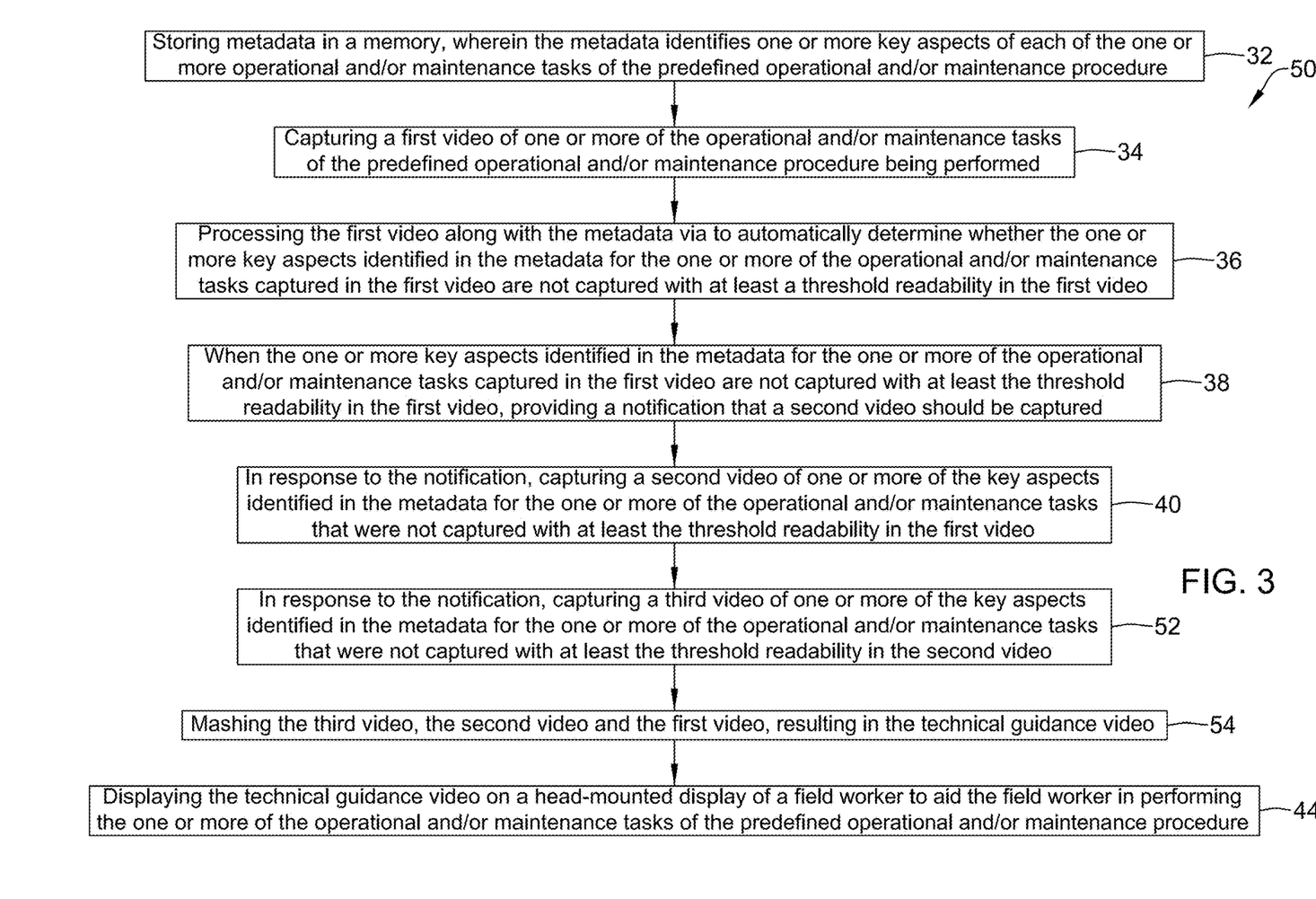
FIG. 3 is a flow diagram showing an illustrative method that may be carried out using the illustrative video production system of FIG. 1.

FIG. 3 is a flow diagram showing an illustrative method 50 of producing a technical guidance video to aid a field worker in performing one or more operational and/or maintenance tasks of a predefined operational and/or maintenance procedure in an industrial facility. The method 50 includes storing metadata in a memory, wherein the metadata identifies one or more key aspects of each of the one or more operational and/or maintenance tasks of the predefined operational and/or maintenance procedure, as indicated at block 32. A first video is captured of one or more of the operational and/or maintenance tasks of the predefined operational and/or maintenance procedure being performed, as indicated at block 34. As seen at block 36, the first video is processed along with the metadata to automatically determine whether the one or more key aspects identified in the metadata for the one or more of the operational and/or maintenance tasks captured in the first video are not captured with at least a threshold readability in the first video.

When the one or more key aspects identified in the metadata for the one or more of the operational and/or maintenance tasks captured in the first video are not captured with at least the threshold readability in the first video, a notification is provided that a second video should be captured, as indicated at block 38. In response to the notification, and as indicated at block 40, a second video is captured of one or more of the key aspects identified in the metadata for the one or more of the operational and/or maintenance tasks that were not captured with at least the threshold readability in the first video. In some cases, and as indicated at block 52, in response to the notification a third video may be captured of one or more of the key aspects identified in the metadata for the one or more of the operational and/or maintenance tasks that were not captured with at least the threshold readability in the first video and the second video. As indicated at block 54, the third video, the second video and the first video are mashed, resulting in the technical guidance video. As indicated at block 44, the technical guidance video is displayed on a head-mounted display of a field worker to aid the field worker in performing the one or more of the operational and/or maintenance tasks of the predefined operational and/or maintenance procedure.

Figure 4:
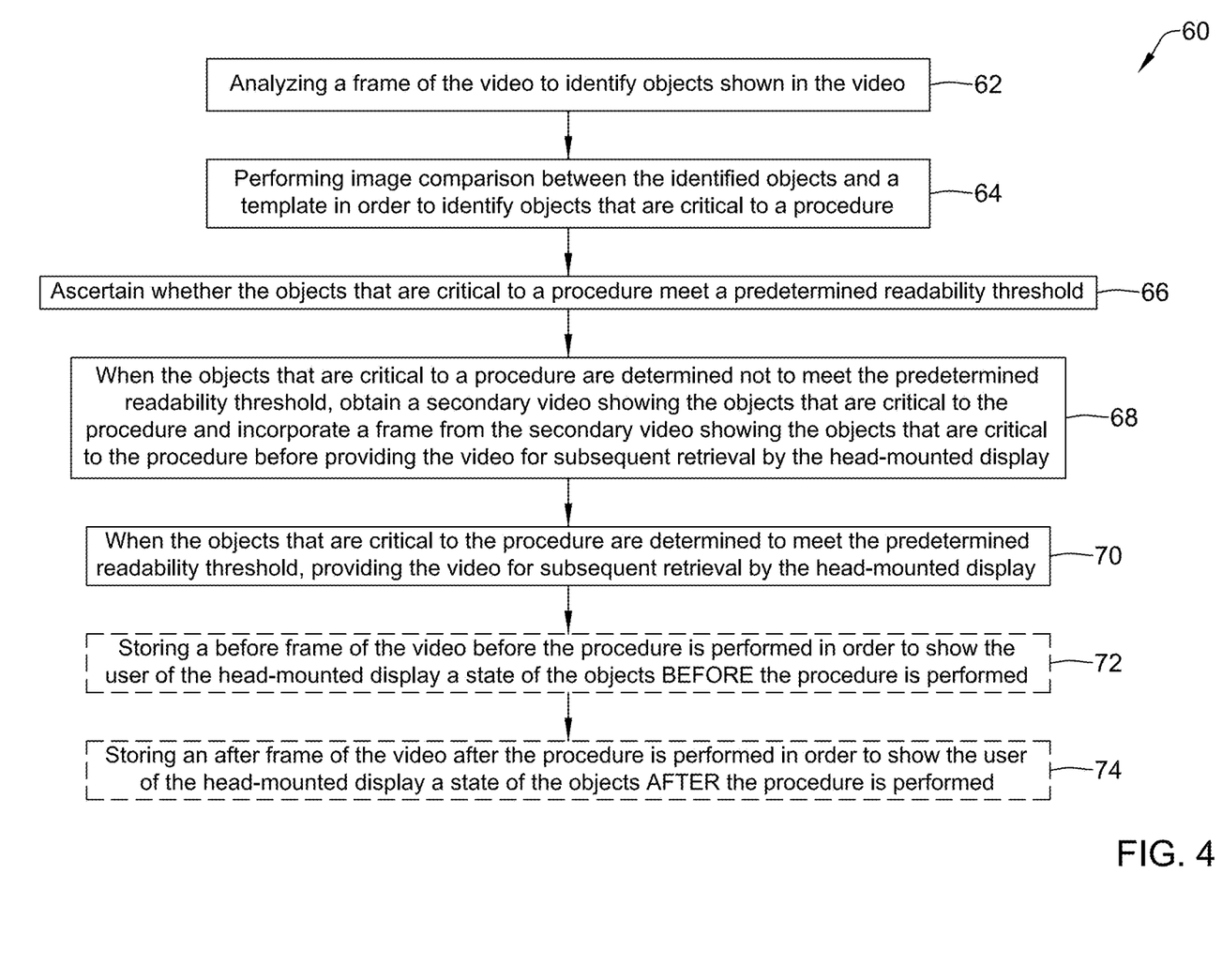
FIG. 4 is a flow diagram showing an illustrative method that may be carried out using the illustrative video production system of FIG. 1.

FIG. 4 is a flow diagram showing an illustrative method 60 of modifying a video for use in a head-mounted display, the video intended to be displayed by the head-mounted display while a user of the head-mounted display is carrying out a task that is illustrated by the video. The method 60 includes analyzing a frame of the video to identify objects shown in the video, as indicated at block 62. Image comparison may be performed between the identified objects and a template in order to identify objects that are critical to a procedure, as indicated at block 64. The method 60 includes ascertaining whether the objects that are critical to a procedure meet a predetermined readability threshold, as indicated at block 66. When the objects that are critical to a procedure are determined not to meet the predetermined readability threshold, and as indicated at block 68, a secondary video may be obtained showing the objects that are critical to the procedure and incorporate a frame from the secondary video showing the objects that are critical to the procedure before providing the video for subsequent retrieval by the head-mounted display. When the objects that are critical to the procedure are determined to meet the predetermined readability threshold, and as indicated at block 70, the video may be provided for subsequent retrieval by the head-mounted display.

In some cases, and as indicated at optional block 72, the method 60 may further include storing a before frame of the video before the procedure is performed in order to show the user of the head-mounted display a state of the objects BEFORE the procedure is performed. Alternatively or additionally, and as indicated at optional block 74, the method 60 may further include storing an after frame of the video after the procedure is performed in order to show the user of the head-mounted display the state of the objects AFTER the procedure is performed.

Figure 5:
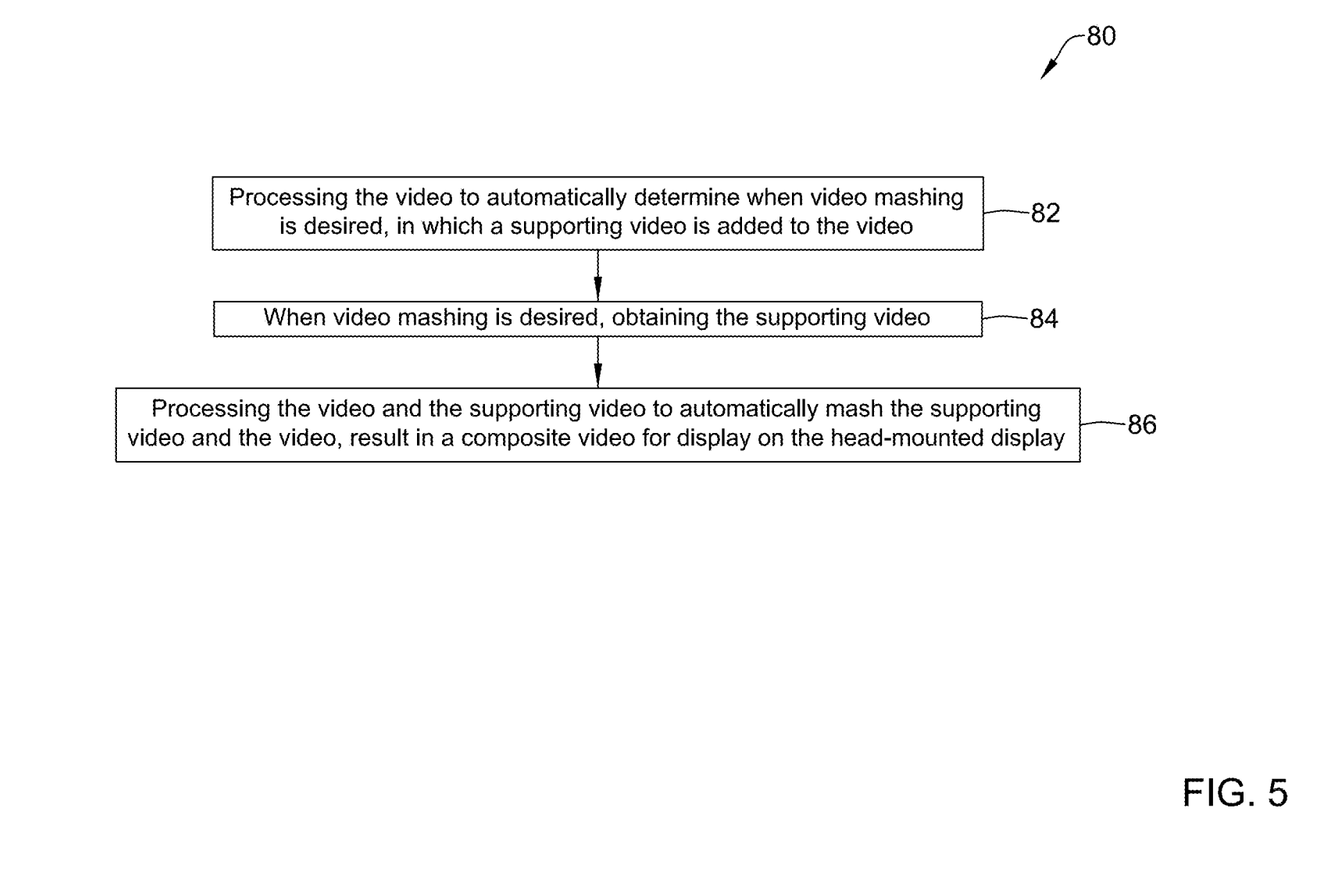
FIG. 5 is a flow diagram showing an illustrative method that may be carried out using the illustrative video production system of FIG. 1.

FIG. 5 is a flow diagram showing an illustrative method 80 of modifying a video for use in a head-mounted display, the video intended to be displayed by the head-mounted display while a user of the head-mounted display is carrying out a task that is illustrated by the video. The method 80 includes processing the video to automatically determine when video mashing is desired, in which a supporting video is added to the video, as indicated at block 82. In some cases, the supporting video may include one of a procedure insert, a procedure cutaway or a procedure sneak. Processing the video to automatically determine when video mashing is desired may, for example, include using metadata that is associated with the task. When video mashing is desired, and as indicated at block 84, obtaining the supporting video may be obtained. As indicated at block 86, the video and the supporting video may be processed to automatically mash the supporting video and the video, result in a composite video for display on the head-mounted display.

Figure 6:
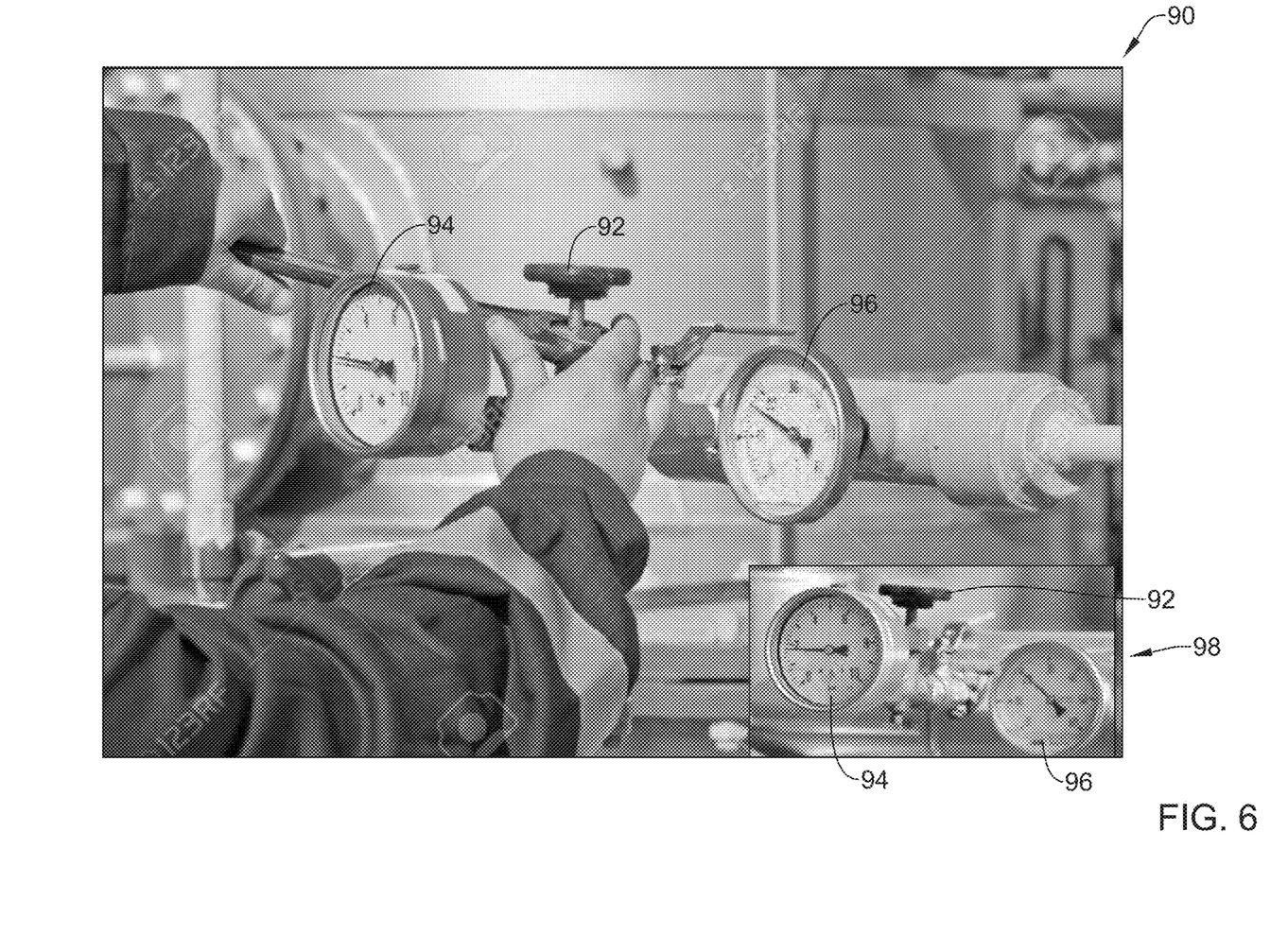
FIG. 6 is an image showing an example of an inset having been added to a video frame.

FIG. 6 is an image showing an example of a Procedure Insert. FIG. 6 shows a main image 90 that includes an assembly of a valve 92, a first gauge 94 and a second gauge 96. As shown, a person is using a wrench to adjust the valve 92. However, in the main image 90, the capture angle is less than ideal, as the first gauge 94 and the second gauge 96 are slightly turned away, and are more difficult to read accurately. Accordingly, the video production system 10 has added an insert 98 that includes a view of the valve 92, the first gauge 94 and the second gauge 96 with a better capture angle that results in the gauges 94, 96 being easier to read accurately.

Figure 7:
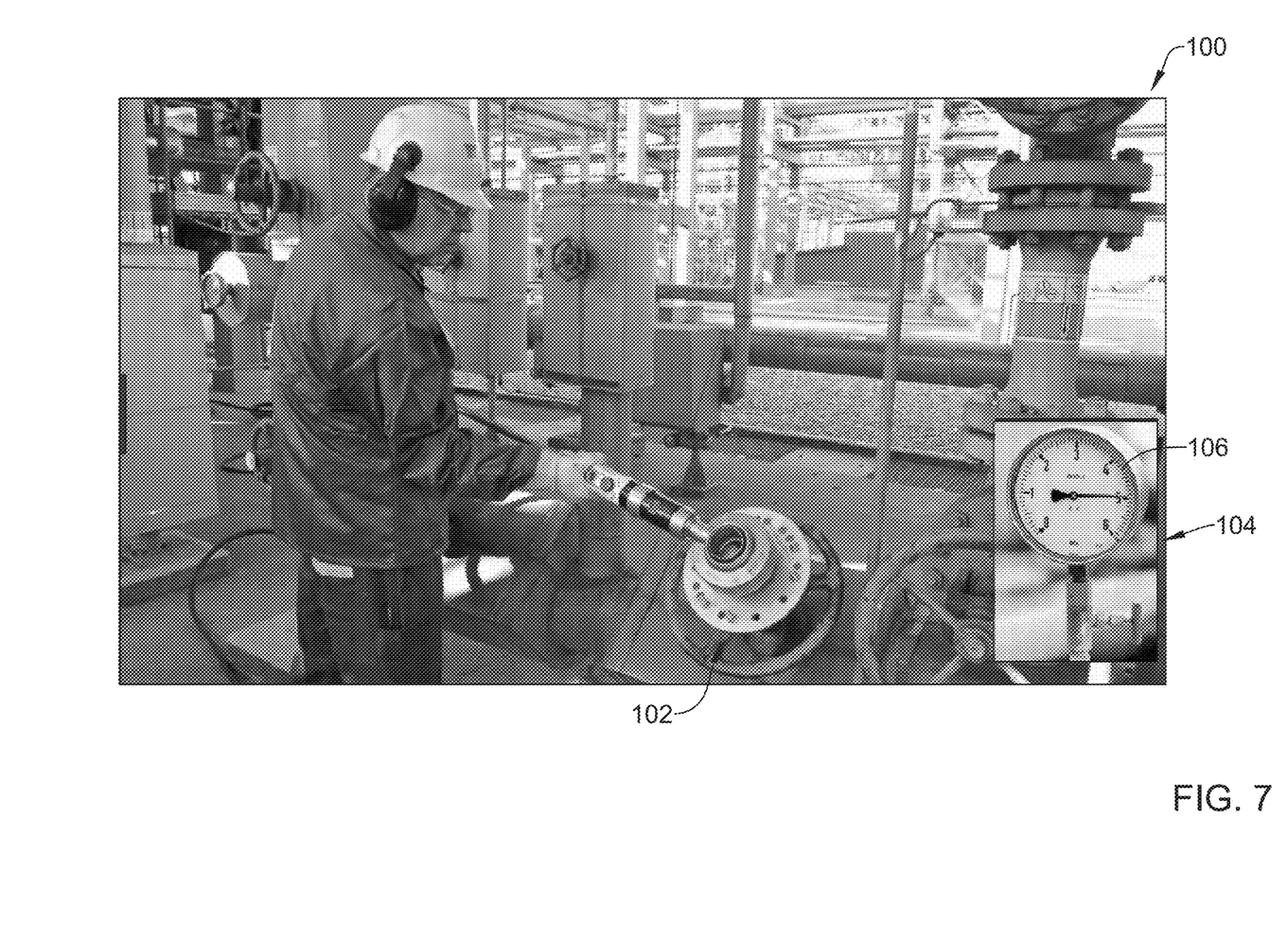
FIG. 7 is an image showing an example of a cutaway having been added to a video frame.

FIG. 7 is an image showing an example of a Procedure Cutaway. FIG. 7 shows a main image 100 that shows a valve 102 that is being adjusted by a worker using a tool of some sort. In this example, the valve 102 is being adjusted in order to maintain a gauge 106 (not visible in the main image 100, and presumably out of camera range) at a particular numerical value. Because it is important for the user to see both the valve 102 and the gauge 106, the video production system 10 has added an insert 104 that shows the gauge 106 that would otherwise not be visible.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method of producing a technical guidance video to aid a field worker in performing one or more operational and/or maintenance tasks of a predefined operational and/or maintenance procedure in an industrial facility, the method comprising:
    storing metadata in a memory, wherein the metadata identifies one or more key aspects of each of the one or more operational and/or maintenance tasks of the predefined operational and/or maintenance procedure, and wherein the one or more key aspects are important for understanding how to perform the one or more operational and/or maintenance tasks, the one or more key aspects including identifying one or more "critical to procedure" objects, and an interaction between at least a first "critical to procedure" object and a second "critical to procedure" object;
    capturing a first video of one or more of the operational and/or maintenance tasks of the predefined operational and/or maintenance procedure being performed;
    processing the first video alongwith the metadata to automatically identify the "critical to procedure" objects, which include the first "critical to procedure" object and a second "critical to procedure" object, and determining whether all "critical to procedure" objects are captured in the first video with at least a threshold readability for understanding how to perform the one or more operational and/or maintenance tasks, and if not, determining that one or more key aspects for understanding how to perform the one or more of the operational and/or maintenance tasks are not captured in the first video with at least the threshold readability for understanding how to perform the one or more operational and/or maintenance tasks in the first video;
    when the one or more key aspects identified in the metadata for the one or more of the operational and/or maintenance tasks captured in the first video are not captured with at least the threshold readability in the first video, providing a notification that a second video should be captured that better shows the one or more key aspects that were not sufficiently captured in the first video;
    in response to the notification, capturing a second video of one or more of the key aspects identified in the metadata for the one or more of the operational and/or maintenance tasks that were not captured with at least the threshold readability for understanding how to perform the one or more operational and/or maintenance tasks in the first video;
    mashing the second video and the first video by inserting selected video frames from the first video into the second video or by inserting selected video frames from the second video into the first video, resulting in the technical guidance video; and
    displaying the technical guidance video on a head-mounted display of a field worker to aid the field worker in performing the one or more of the operational and/or maintenance tasks of the predefined operational and/or maintenance procedure.

2. The method of claim 1, wherein a "critical to procedure" object is not captured in the first video with at least the threshold readability for understanding how to perform the one or more operational and/or maintenance tasks when the first video is captured from a camera angle that is too oblique relative to the "critical to procedure" object.

3. The method of claim 1, wherein a "critical to procedure" object is not captured in the first video with at least the threshold readability for understanding how to perform the one or more operational and/or maintenance tasks when the first video is captured such that the "critical to procedure" object is not in focus.

4. The method of claim 1, wherein a selected one of the key aspects identified in the metadata for one or more of the operational and/or maintenance tasks captured in the first video is not captured with at least the threshold readability for understanding how to perform the one or more operational and/or maintenance tasks when the selected one of the key aspects identifies an interaction between the first "critical to procedure" object and the second "critical to procedure" object, and the first video does not capture the interaction between the first "critical to procedure" object and the second "critical to procedure" object.

5. The method of claim 1, wherein determining whether all "critical to procedure" objects are captured in the first video comprises comparing objects identified in the first video to template images of the "critical to procedure" objects identified in the metadata.

6. The method of claim 1, wherein one or more of the "critical to procedure" objects comprises a piece of equipment, wherein the piece of equipment is identified in the metadata.

7. The method of claim 6, wherein the one or more key aspects comprises visibility of a predetermined part of a particular"critical to procedure" object and/or a predetermined threshold magnification of the predetermined part of the particular "critical to procedure" object, wherein the predetermined part of the particular "critical to procedure" object and/or the predetermined threshold magnification of the predetermined part of the particular "critical to procedure" object is identified in the metadata.

8. The method of claim 1, wherein displaying the technical guidance video on the head-mounted display of the field worker occurs in response to the field worker requesting display of the technical guidance video on the head-mounted display.

9. The method of claim 1, wherein inserting the selected video frames from the second video into the first video comprises overlaying the selected video frames over part of one or more frames of the first video.

10. The method of claim 1, wherein inserting the selected video frames from the second video into the first video comprises splicing in the selected video frames between two frames of the first video.

11. The method of claim 1, wherein mashing the second video and the first video comprises inserting selected video frames from the first video into the second video.

12. The method of claim 1, further comprising: capturing a third video of one or more of the key aspects identified in the metadata for the one or more of the operational and/or maintenance tasks that were not captured with at least the threshold readability in the first video and the second video;
mashing the third video, the second video and the first video, resulting in the technical guidance video; and
displaying the technical guidance video on the head-mounted display of the field worker to aid the field worker in performing the one or more of the operational and/or maintenance tasks of the predefined operational and/or maintenance procedure.

13. A method of modifying a video for use in a head-mounted display, the video configured to be displayed by the head-mounted display while a user of the head-mounted display is carrying out a procedure that is illustrated by the video, the method comprising:
storing metadata in memory, wherein the metadata identifies one or more key aspects of the procedure, wherein the key aspects include an interaction between "critical to procedure" objects including a first "critical to procedure" object and a second "critical to procedure" object;
capturing a video of the procedure;
analyzing a frame of the video to automatically identify objects shown in the video;
automatically performing image comparison between the identified objects and one or more templates of the "critical to procedure" objects identified in the metadata associated with the procedure in order to identify objects in the video that are considered to be "critical to the procedure" objects;
ascertaining based on one or more software algorithms whether the "critical to procedure" objects identified in the metadata are found in the video and meet a predetermined readability threshold allowing understanding of the "critical to procedure" objects;
when the "critical to procedure" objects are determined not to be found in the video ordo not meet the predetermined readability threshold for understanding of the "critical to procedure" objects, obtain a secondary video showing at least one or more missing "critical to procedure" objects and incorporate into the video one or more frames from the secondary video showing the one or more of the missing "critical to procedure" objects before providing the video for subsequent retrieval by the head-mounted display;
based on determining that the "critical to procedure" objects meet the predetermined readability threshold, providing the video for subsequent retrieval by the head-mounted display; and
displaying the video on the head-mounted display to aid the user in performing the procedure.

14. The method of claim 13, further comprising storing a before frame of the video before the procedure is performed in order to show the user of the head-mounted display a state of the objects BEFORE the procedure is performed.

15. The method of claim 14, further comprising storing an after frame of the video after the procedure is performed in order to show the user of the head-mounted display the state of the objects AFTER the procedure is performed.

* * * * *